United States Patent [19]

Carr

[11] 3,834,575

[45] Sept. 10, 1974

[54] CONTAINER FRONT END CONSTRUCTION

[75] Inventor: George W. Carr, Cincinnati, Ohio

[73] Assignee: Pullman Incorporated, Chicago, Ill.

[22] Filed: May 10, 1973

[21] Appl. No.: 359,050

[52] U.S. Cl.................. 220/1.5, 220/4 F, 296/28 M
[51] Int. Cl............................................ B62d 33/00
[58] Field of Search ..................... 220/1.5, 4 R, 4 F; 296/28 R, 28 M, 36; 52/595

[56] References Cited
UNITED STATES PATENTS

| | | | |
|---|---|---|---|
| 2,812,973 | 11/1957 | Pritchard | 296/28 M |
| 3,010,755 | 11/1961 | Black | 296/28 M |
| 3,401,814 | 9/1968 | Chiswell et al. | 220/4 F |
| 3,547,483 | 12/1970 | Ehrlich | 296/28 M |
| 3,556,583 | 1/1971 | Ellard | 296/28 R |
| 3,570,698 | 3/1971 | Dougherty | 220/1.5 |
| 3,684,122 | 8/1972 | Bonomi | 220/1.5 |
| 3,692,354 | 9/1972 | Tuerk | 296/36 |

Primary Examiner—John Petrakes
Attorney, Agent, or Firm—Richard J. Myers

[57] ABSTRACT

A container construction such as a truck body for a vehicle or the like comprising a front wall and a pair of side walls connected by a pair of vertically extending front corner structures, each corner structure including an upright front corner post connecting with an end of the front wall and an upright side corner post connecting with the front corner post and the forward end of a respective side wall. The vertically extending connecting structure between the corner post and side post includes dovetailing front and side corner post portions and laterally spaced fastening means on the dovetailing front and side post portions or laterally spaced front and side post overlapping portions on the dovetailing front and side post portions that allow relative vertical sliding movement between the front and side walls for assembly of the container.

14 Claims, 9 Drawing Figures

3,834,575

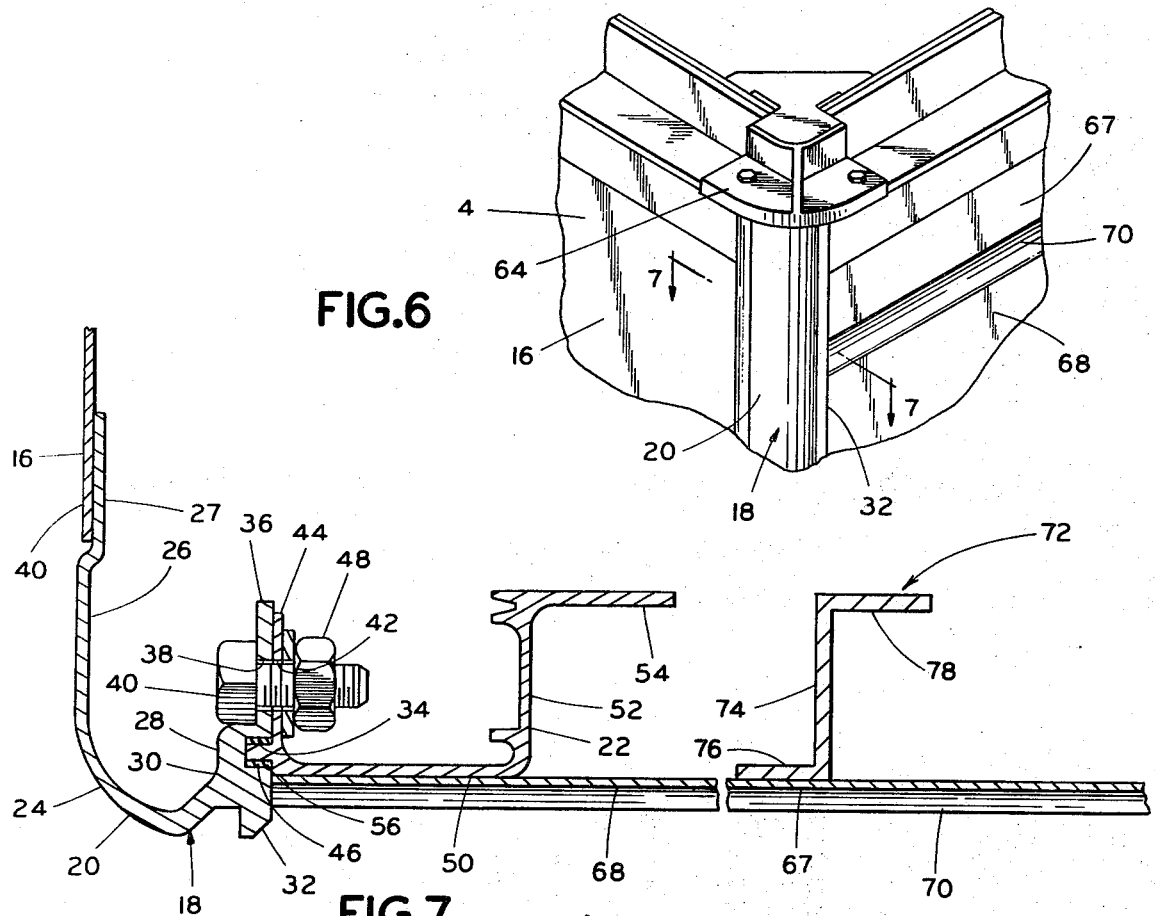
FIG.6
FIG.7
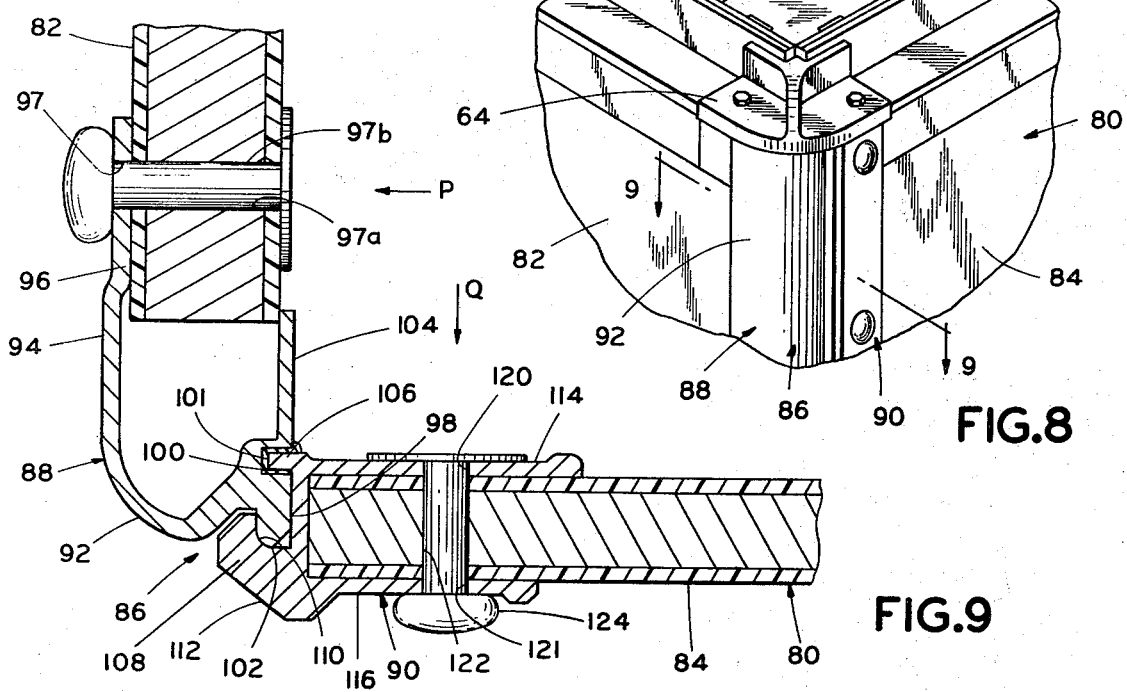
FIG.8
FIG.9

CONTAINER FRONT END CONSTRUCTION

BACKGROUND OF THE INVENTION

1. Field of the Invention

This invention relates to the field of cargo body construction and in particular to the construction of a cargo container which may be placed upon a truck or highway trailer.

2. Description of the Prior Art

It has heretofore been known to provide for various types of container construction but there has been a lack of uniformity of the structural members of the container so that the framework for one type of container cannot be used in another container, particularly one dealing with the front wall corner post arrangements of the containers. It has also been desirable to provide for a front wall corner post arrangement that gives a maximum volume inside the container. These problems are solved by the instant disclosed inventive device.

SUMMARY OF THE INVENTION

This invention provides for a cargo body front corner connection arrangement that may be used with side walls of different construction. This arrangement finds particular use in containers for truck bodies or highway trailers.

The invention provides a post construction for connecting the front wall to different types of side wall arrangements. The truck body may use exterior side posts or interior side posts or fiberglass reinforced polyester plywood. In all of these constructions the front wall corner posts are the same. In the interior post and the exterior post construction the same post in the side wall is used and its bolted connection to the front wall is the same. In the fiberglass plywood construction, in order to have maximum volume and have a clean corner connection inside without any protruding bolts or nuts, a fastenerless connection is made, this being a vertically sliding connection between the front corner post and the side wall post wherein the side wall post is slid into the front wall corner post and then it is riveted to the side wall panel. All longitudinal and lateral forces are resisted by such an arrangement. Additionally, caulking in the joint between the front corner post and the side wall post provides for water tightness.

These and other objects and advantages will become apparent from reference to the following description, the appended claims and the attached drawings.

BRIEF DESCRIPTION OF THE DRAWINGS

FIG. 6 is an enlarged partial perspective view of a front corner of the container shown in FIG. 5;

FIG. 7 is a sectional view taken along line 7—7 of FIG. 6;

FIG. 8 is a partial perspective view of a front corner of a container or cargo body having fiberglass reinforced polyester plywood walls; and FIG. 9 is a sectional view taken along line 9—9 of FIG. 8.

DESCRIPTION OF THE PREFERRED EMBODIMENTS

Figure 1:
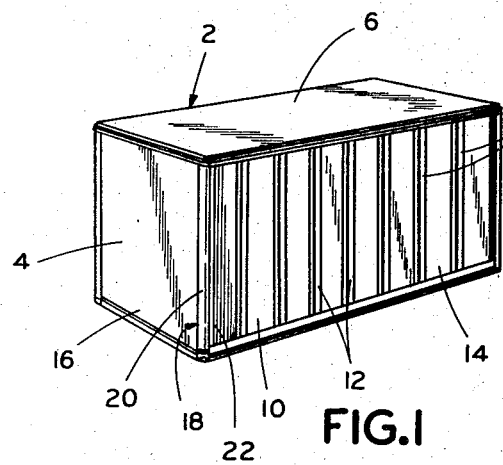
FIG. 1 is a perspective view of a container or cargo body provided with outside or exterior posts.
Figure 2:
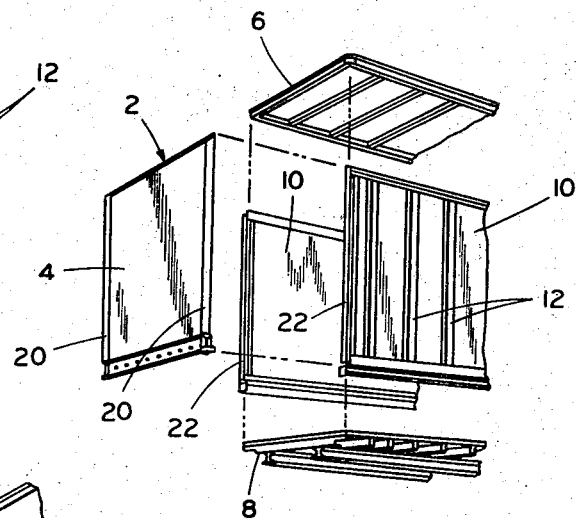
FIG. 2 is an exploded partial view of the cargo body shown in FIG. 1.
Figure 3:
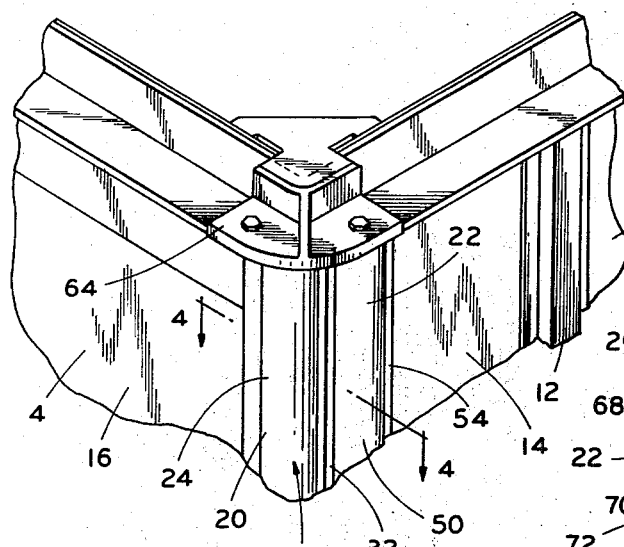
FIG. 3 is a perspective partial view of a front corner of the container.

With reference now to the drawings and in particular with reference to FIGS. 1–4, there is shown a cargo body or container such as a truck body 2 having a front wall 4, a rear wall (not shown), roof 6, a bottom floor structure 8 with crossmembers and longitudinal beams, and a pair of side walls 10. The front and rear walls are made of aluminum and the roof is aluminum. The side walls which are also aluminum are provided with a smooth exterior skin and have exterior posts 12 mounted on the skin or side sheet 14. The front wall comprises an aluminum skin or sheet 16. The front wall 4 connects with each of the side walls 10 by means of a combined front and side corner post structure 18 which includes a front corner post 20 and a side corner post 22 interconnected with one another and with sheets 16 and 14 respectively. The front corner post 20 includes a curved corner section 24 having a laterally extending front portion 26 inwardly offset at its end which is attached to front sheet 16. The curved corner section 24 is provided with a rearward connecting section 28 which includes an enlarged bulbous or protuberance portion 30 which has an outwardly projecting flange 32 and has a rearwardly facing slot 34. The rearward extending connecting section 28 also includes a laterally inwardly directed flange 36 which extends inwardly from the protuberance 30 and is provided with an aperture 38 through which extends a bolt 40 which extends through an aperture 42 in an inwardly directed laterally extending flange 44 of the side corner post 22. The side corner post flange 44 towards its laterally outward end is provided with a forwardly directed extension or finger portion 46 which extends into the slot 34 and cooperates with the tightening nut 48 on the inner end of the bolt 40 for holding the side post 22 to the front corner post 20 to resist all longitudinal and lateral forces imposed on the cargo body. The side corner post further includes a longitudinally extending outer wall 50 which at its rear end is connected to transversely or laterally extending wall 52 which is connected to inner longitudinally extending end flange 54. The side corner post 22 is generally U-shaped as defined by the forward lateral flange 44, the longitudinal outer wall 50 and the rearward lateral wall 52. The laterally extending front portion 26 has its end or flange 27 attached on the inside of the sheet 16 whereas the flange 54 of the side corner post is attached on the outside of sheet 14. For a good weather seal caulking 56 is provided in the slot 34 around the finger portion 46. The exterior side posts 12 are U-shaped and are provided with the lateral walls 58, the longitudinal end flanges 60 and the outer longitudinal wall 62, the end flanges 60 being attached to the outside of the skin 14. As seen in FIG. 3, the top corner coupler 64 couples the upper portions of the front and side wall together over the front and side corner post structure 18.

Figure 5:
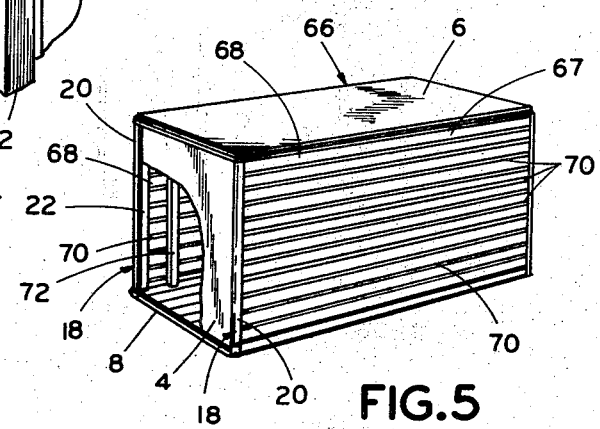
FIG. 5 is a perspective view of a container or cargo body having interior posts and employing the inventive design.
Figure 4:
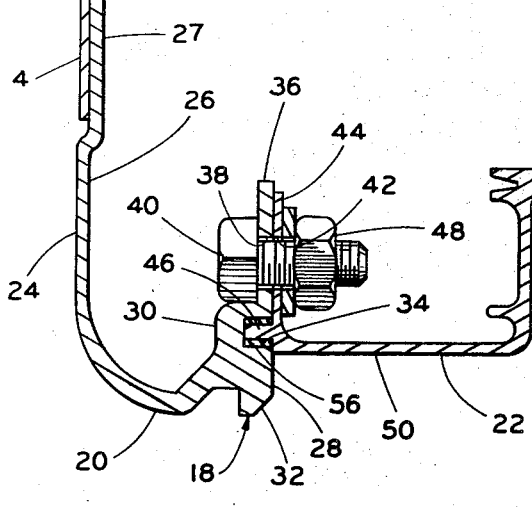
FIG. 4 is a sectional view taken along line 4—4 of FIG. 3.
Figure 4:
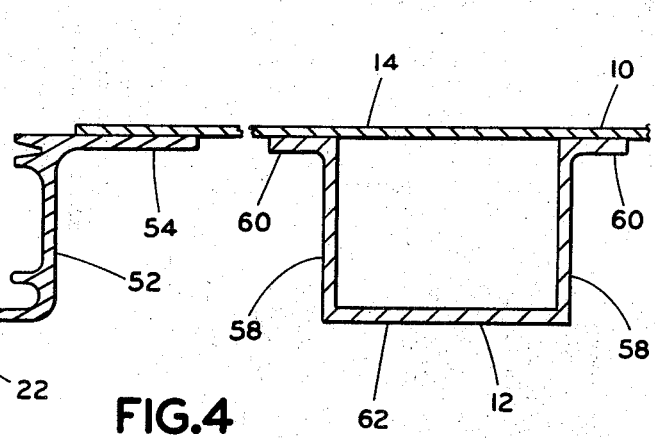

FIGS. 5–7 illustrate the use of the inventive front and side corner post structure 18 for coupling a container such as a truck body front wall to corrugated side walls 68 of a container such as a truck body 66, the side walls having side sheeting or skin 67 having corrugations 70. Interior side posts 72 are located on the inside of the container 66 and have lateral wall 74 and end flanges 76 connecting to the side skin 67 and having a longitudinal inner wall 78. Other than this difference, the embodiment of FIGS. 5–7 is the same as FIGS. 1–4 and, therefore, where the same structure exists in both designs the same reference characters are used. As in the design shown in FIGS. 1–4, the design shown in FIGS. 5–7 is of aluminum construction. It is thus noted that the skin 67 is exteriorly of the side corner post 22 and the side posts 72.

With reference now to FIGS. 8–9 there is shown a partial view of a cargo body 80 which is similar to the other cargo bodies described above except that the front walls 82 and the side walls 84 are made of fiberglass reinforced polyester plywood or honeycomb. The front wall is connected to its respective side walls by front corner and side post structures 86 which include intercoupled front corner post 88 and front side post 90. The front corner post 88 is like corner post 20 and has a curved corner section 92 provided with a front lateral part 94 having an end 96 with an aperture 97 through which extends rivet 97a which extends through aperture 97b in the front wall 82 for holding the front wall to the front corner post 88. The front corner post 88 is further provided with a rear coupling portion 98 which has a slot 100 and an outer lateral dovetailing flange 102 and also has an inner attaching flange 104 for sandwiching the plywood therebetween and the flange 96. A forward coupling portion 108 of the front side post 90 slidably couples or dovetails with the rear coupling portion 98 of the front corner post 88. The forward coupling portion 108 has an enlarged end part or hook 112 that is provided with a slotted portion or aperture 110 for receiving the dovetailing flange 98 and defined in part by the longitudinally extending dovetailing end flange 106 that is in slot 100 which contains caulking 101 thereabout to provide a good seal. The front side post 90 is further provided with a rearwardly extending inner longitudinal flange or finger 114 in a rearwardly extending outer longitudinal flange or finger 116 which flanges 114 and 116 receive the plywood or honeycomb side wall 84 and the flanges 114 and 116 have apertures 120 and 121 and the side wall 84 has aperture 122 and rivet 124 extends through the apertures for pinning the side wall to the front side post. In the designs shown in FIGS. 1–4 and 5–7 the front corner post and side post are held together by dovetailing of parts 34 and 46 and by the bolt 40, whereas in the design shown in FIGS. 8–9 the front corner post and the front side post are slid together so that the side wall post is slid into the front wall corner post and then the side wall post is riveted to the side wall panel. Referring to FIGS. 8–9 it will be seen that all forces in the direction of P are resisted by the hook connection defined by parts 110 and 112 and all of the forces in the direction of Q are resisted by the longitudinal end dovetailing flange or tongue 106.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. In a container for a vehicle or the like, a front corner construction comprising:
   a front wall,
   a pair of laterally spaced front corner posts each having a laterally inwardly directed extension attached to a respective opposed end of the front wall,
   a side corner post being connected with each front corner post,
   a side wall having a forward portion being connected to each side corner post,
   each front corner post having a rear extension extending laterally of the container and said rear extension including a first force resisting means,
   each side corner post having a forward extension extending laterally of the container and abuttingly engaging with the rear extension of an adjacent front corner post, said forward extension including a second force resisting means coupling with said first force resisting means of an adjacent front corner post resisting lateral forces on the container side wall,
   first coupling means on one extension and second coupling means on the other extension adjacent said one extension laterally of the first and second force resisting means cooperative in resisting fore-and-aft forces on the front wall of the container.

2. The invention according to claim 1, and
said first and second force resisting means including tongue means on one extension and groove means on the other extension holding the extensions together.

3. The invention according to claim 1, and
said first and second coupling means including bolt means on each extension holding the extensions together in locked condition.

4. The invention according to claim 1, and
said first and second coupling means including hook groove means on one extension and tongue means on the other extension and cooperating with the first and second force resisting means to hold the extensions together in locked condition.

5. The invention according to claim 1, and
said container including a plurality of intermediate side posts on each side thereof and in longitudinal alignment with one another and with a respective side corner post, said corner side post and said intermediate side posts being mounted on the outside of a respective side wall.

6. The invention according to claim 5, and
said first and second coupling means including bolting means in longitudinal alignment with said side corner post and outwardly of said side wall,
said first and second force resisting means including a tongue and groove arrangement on the extension outwardly of the bolting means.

7. The invention according to claim 1, and
said container including a plurality of intermediate side posts on each side thereof in longitudinal alignment with one another and with a respective side corner post,
said side corner post and said intermediate side posts being mounted on the inside of a respective side wall.

8. The invention according to claim 7, and
said first and second coupling means including bolting means in longitudinal alignment with said side corner post and inwardly of said side wall, said first and second force resisting means including a tongue arrangement outwardly of the bolting means and inwardly of the side wall.

9. The invention according to claim 1, and said side wall being a longitudinally extending panel and said side corner post including finger portions extending about and being fixedly attached to said panel.

10. The invention according to claim 1, and said first and second force resisting means and said first and second coupling means each including a tongue and groove structure cooperating with one another and with the tongue and groove on the opposite side of the car to lock the front wall to a pair of side walls, the tongue and groove of each structure having a vertical sliding relation to one another in their assembling together.

11. The invention according to claim 10, and the tongue and groove structure defining the first and second force resisting means being laterally inward of the tongue and groove structure of the first and second coupling means, both the structures being in longitudinal alignment with the side wall.

12. In a container for a vehicle or the like, a front corner construction comprising:

a front wall, a pair of laterally spaced front corner posts each having a laterally inwardly directed extension attached to a respective opposed end of the front wall, a side corner post being connected with each front corner post, a side wall having a forward portion being connected to each side corner post, each front corner post having a rear extension extending laterally of the container and including a first rearwardly facing groove portion, each side corner post having a forward extension extending laterally of the container and abuttingly engaging with the rear extension of an adjacent front corner post, said forward extension including a second forwardly facing tongue portion extending in and coupling with a groove portion of an adjacent front corner post resisting lateral forces on the container side wall, fastening means on each extension laterally inward of said tongue and groove portions bolting the extensions together and resisting fore-and-aft and lateral forces on the container, said container having a plurality of intermediate side posts, said tongue and groove portions and side fastening means being in longitudinal alignment with said side corner post and said intermediate side posts and being clear of the internal loading area.

13. In a container for a vehicle or the like, a front corner construction comprising:

a front wall, a pair of laterally spaced front corner posts each having a laterally inwardly directed extension attached to opposed ends of the front wall, a side corner post being connected with each front corner post, a side wall having a forward portion being connected to each side corner post, each front corner post having a rear extension extending laterally of the container and including a laterally inwardly spaced groove portion and a laterally outwardly spaced protuberance portion, each side corner post having a forward extension extending laterally of the container and abuttingly engaging with the rear extension of an adjacent front corner post, said forward extension including a laterally inwardly spaced forwardly facing tongue portion and a laterally outwardly spaced hook portion, said tongue portion extending in and coupling with a groove portion of an adjacent front corner post resisting lateral forces on the container side wall, said hook portion dovetailing with a protuberance of the adjacent front corner post in resisting fore-and-aft forces on the container front wall, said tongue and groove portions cooperating with said protuberance and hook portion to provide for a vertically slidable interlock at the front corners of the containers.

14. The invention according to claim 13, and each of said front corner posts having forwardly of the interlock laterally inwardly projecting fingers extending about a respective end of the front wall and each of said side corner posts having rearwardly of the interlock longitudinally rearwardly extending fingers extending about a respective forward portion of a side wall, the interlock being substantially in longitudinal alignment with said side wall.

* * * * *